April 4, 1972  A. G. ECCLES  3,654,150

METHOD FOR FILTERING MOLTEN METAL

Filed Aug. 8, 1969  7 Sheets-Sheet 1

Fig. 1.

INVENTOR.
ANTHONY GARTH ECCLES
BY
Christopher C. Dunham
ATTORNEY

3,654,150
METHOD FOR FILTERING MOLTEN METAL
Anthony Garth Eccles, Arvida, Quebec, Canada, assignor to Alcan Research and Development Limited, Montreal, Quebec, Canada
Filed Aug. 8, 1969, Ser. No. 848,597
Int. Cl. B01d 37/04
U.S. Cl. 210—69          2 Claims

ABSTRACT OF THE DISCLOSURE

Molten metal such as aluminum is filtered (e.g. for casting) by passing it through a woven mesh filter which is maintained entirely submerged in the molten aluminum. The filter in one form comprises plural contiguous layers of glass cloth stretched across the upstream side of a rigid flat grid disposed substantially horizontally in a confined path for conducting a flow of the molten aluminum, and the flow is advanced upwardly through the filter from the under side thereof. Ahead of the filter, the molten aluminum may be conducted through suitable means for removing entrained gas. Beyond the filter, the molten aluminum may be conducted in quiescent flow at a uniform level (higher than the level of the filter), e.g. to the upper end of one or more molds wherein it is cast into ingots.

BACKGROUND OF THE INVENTION

This invention relates to the treatment of molten metals, and more particularly to procedures and apparatus for filtering molten metals such as aluminum. In an important specific aspect, the invention is directed to improvements in filtering molten aluminum incident to casting of the metal. It will be understood that the term "aluminum" as used herein embraces aluminum base alloys.

One example of an operation in which the present invention may be used is the continuous casting of aluminum ingots. Such operation, in an illustrative instance, involves progressive supply of molten metal to the upper end of an axially vertical mold, and concurrent progressive withdrawal of a solidifying ingot from the open lower end of the mold, until a desired length of ingot has been cast. The mold wall is chilled to solidify the peripheral portion of the ingot within the mold, and the solid external surface of the ingot emerging below the mold is directly chilled by sprays of coolant liquid to promote internal solidification of the ingot. Within the mold there is contained a pool of molten aluminum metal, progressively augmented as stated by supply of fresh molten metal during the casting operation, and extending downwardly as a molten sump into the externally solid ingot body.

Ordinarily, the supplied molten metal is filtered at or ahead of the point at which it is introduced to the mold, in order to remove contaminant solid materials carried in particle form in the metal. These particles, if permitted to enter the mold, become inclusions and/or create voids in the cast ingot, and may cause undesirable flaws in articles subsequently produced from the ingot as by extrusion, rolling or other working and shaping operations. The particles that must be thus removed by filtration include (in addition to such materials as titanium diborides and aluminum-magnesium oxides) aluminum oxide which forms readily (e.g. as a skin) on any molten aluminum surface exposed to air and, though lighter than the metal, may be broken up into minute particles and entrained in a flow of the metal by any minor turbulence that disturbs the surface of the flowing metal. Small quantities of gas, especially hydrogen, are commonly present in a molten aluminum flow and may contribute to the creation of voids in a continuously cast ingot.

Filtration of the metal may be effected by passing it through a woven mesh filter fabricated of a material that does not deteriorate when exposed to the molten metal. One known type of such filter used in continuous casting of aluminum comprises a bag or basket consisting of one or two layers of glass cloth (i.e. cloth woven from glass fiber) suspended in the upper portion of a continuous casting mold so as to be partially immersed in the pool of molten aluminum therein. The molten metal supplied to the mold is delivered to the interior of the bag or basket and flows out and down through the glass cloth into the mold. Glass cloth affords various advantages as a filtering material for molten aluminum, since it is readily available and relatively low in cost, simple and convenient to maintain as a filter, highly resistant to deterioration under aluminum casting conditions, and does not contribute impurities to the ingot being cast.

Although glass cloth filters of the type described afford substantial filtering action, it is found in many instances, and especially in production of aluminum articles requiring a very high degree of freedom from flaws, that even with use of such a filter, ingots produced by continuous casting still tend to contain an undesirably high number of inclusions and/or voids attributable to contaminant particles in the molten metal from which the ingots are cast. Accordingly, for continuous casting and other purposes, it would be desirable to provide means and methods of filtration affording significant reduction in content of contaminant particles in the filtered metal, as compared with metal filtered through conventional glass cloth filter bags and baskets, yet at the same time also affording the aforementioned advantages of a woven mesh such as glass cloth as a filtering material.

While the art of filtering molten metal has been discussed above in its application to the continuous casting of aluminum, it will be appreciated that the considerations set forth are also relevant to the filtering of molten aluminum in other operations, and to the filtering of other molten metals, i.e. molten metals having chemical and physical properties that permit use of a woven mesh such as glass cloth as a filtering material.

SUMMARY OF THE INVENTION

The present invention broadly contemplates filtering molten metal by advancing the metal through a woven mesh filter extending entirely across a completely laterally confined portion of a defined flow path for the metal while continuously maintaining the metal at a liquid level sufficiently high both upstream and downstream of the filter in the path so that the filter is continuously entirely submerged in the flow. The woven mesh should be fabricated of a material that is resistant to physical and chemical deterioration under conditions of use; an example of such woven mesh, found very preferable (especially for filtration of molten aluminum), is glass cloth. For simplicity and convenience, the invention will hereinafter be further described with reference to embodiments in which the woven mesh is constituted of glass cloth.

Stated with reference to the filtering of molten aluminum, it is found that use of a completely submerged glass cloth filter in accordance with the invention achieves assured superior freedom of the filtered metal from contaminant particles, as compared with metal filtered through a conventional glass cloth filter bag or basket that is only partially submerged in the molten metal. In the case of a partially submerged filter, the molten metal level on the upstream side of this filter is ordinarily higher than that on the downstream side of the filter, owing to the pressure differential across the filter; as a result molten metal tends to pass through the filter above the liquid level on the downstream side and to descend to that level in more or less turbulent jets or streams. The minor turbulence thus created, and the exposure of this turbulently flowing metal to air, tend in turn to introduce oxide particles into the metal downstream of the filter, recontaminating the filtered metal. Also, the downstream liquid level usually undergoes some variation; as it falls and rises, a layer of oxide may be formed on the exposed wetted portion of the downstream filter surface and then picked up and introduced into the filtered metal. By maintaining the filter completely submerged, these conditions are avoided, and the entirety of the molten metal flow passes quiescently through the filter away from any exposed metal surface on which oxide can form.

In one sense, then, the invention embraces of the discovery that exposure of even a very minor portion of a woven mesh filter above the surface of molten aluminum being filtered may result in significant and undesirable recontamination of the filtered metal with oxide particles introduced thereto at the downstream side of the filter; and that this recontamination may be avoided by maintaining a woven mesh filter entirely submerged in molten metal in a completely laterally confined portion of a flow path which directs the entire flow of metal through the filter.

The laterally confined path portion may conveniently be defined by wall structure extending to a level substantially above the uppermost extent of the filter both upstream and downstream of the filter, the entire periphery of the filter being secured to this wall structure. Also, the molten metal is supplied to the upstream side of the filter at a head continuously maintained sufficiently high so that the liquid level downstream of the filter is continuously substantially above the uppermost extent of the filter.

As a further particular feature of the invention, the filter preferably comprises plural (i.e. two or more) layers of glass cloth. In one example of arrangement, these plural glass cloth layers may be disposed in contiguous relation to each other and supported by a rigid grid fixedly positioned in and extending across the aforementioned laterally confined path portion downstream of and in contiguous relation to the filter. It is found that use of two or more layers of glass cloth to constitute the filter provides superior filtering action, in that the more layers of cloth used, the fewer particles traverse the filter.

While two layers of glass cloth are found to provide highly satisfactory filtering action in many instances, the present invention permits use of a larger number of layers (i.e. three or more) if desired. It will be understood that as the number of layers of glass cloth is increased, for cloth having openings of any given size, the pressure head necessary to force the molten metal through the filter increases. In the case of a partially submerged filter, this increase in pressure head enhances the difference in level of molten metal on the upstream and downstream sides of the filter respectively. As that difference in level becomes greater, so does the tendency of metal to flow through the filter above the downstream level and to recontaminate the filtered metal by introducing oxide particles thereto, as already explained. Also, the strength of an unsupported glass cloth filter such as a conventional bag or basket may be insufficient to withstand the presssure head required to force the metal through it, if the filter has as many as three or more layers of glass cloth. The complete submergence of the filter of the present invention, and also the use of a supporting grid on the downstream side of the filter, overcomes these difficulties and permits use of a larger plurality of glass cloth layers than is feasible in the case of a partially submerged filter unsupported on its downstream side.

As a still further feature of the invention, the filter preferably extends substantially horizontally across the aforementioned laterally confined path portion, and the molten metal is advanced vertically upwardly therethrough. The lower surface of the filter is thus the upstream side of the filter. With this orientation of the filter and the molten metal flow direction, the force of gravity acting on particles of relatively heavy material carried by the molten metal tends to draw these particles downwardly away from the filter on the upstream side thereof, and thus contributes to the effectiveness of the filtering action, i.e. in preventing passage of particles through the filter.

One further advantage of the invention, especially in embodiments incorporating the feature just described, is that it eliminates the problems associated with development of an excessive pressure head upstream of (i.e. within the interior of) a conventional glass cloth filter bag or basket. Such head, if not reduced, may lead to overflowing of the bag, and hence to passage of unfiltered metal downstream of the bag. Commonly, when an excessive pressure head develops in a conventional filter bag, the frame or other structure supporting the bag is subjected to physical rapping, which relieves the head but also tends to introduce oxide particles into the metal downstream of the filter. Since the filtering arrangement of the invention avoids any possibility of overflow of metal past the filter, there is never any need to rap the filter, and hence the recontamination of filtered metal produced by such rapping does not occur.

Downstream of the filter, the flow of molten metal is preferably conducted quiescently to the locality in which it is to be used, e.g. cast, so as to avoid any disruption or turbulence of the surface of the filtered molten metal, such as might tend to recontaminate the filtered metal with oxide formed and floating on the surface. For example, in use of the present method in a continuous casting operation, a flow of molten aluminum may be conducted from the downstream side of the filter quiescently along a horizontal path at a liquid level which is uniform over the full extent of the horizontal path, to a locality above a continuous casting mold, from which locality the molten aluminum descends quiescently into the mold. The liquid level in the horizontal path is higher than the mold and also higher than the uppermost extent of the filter.

Further, and with special advantages in the continuous casting of aluminum, entrained gas (e.g. hydrogen) may be removed from the molten metal flow upstream of the filter. It is found that the minute quantities of gas commonly present in a flow of molten aluminum tend to coalesce around entrained particles in the aluminum and thus contribute to undesired formation of voids in ingots cast from the metal. Accordingly, the gas-removing step cooperates with the particle-removing filtration of the metal in minimizing occurrence of voids in cast ingots.

The invention further contemplates the provision of apparatus, with which the foregoing procedures may be practiced, including means for defining a path for conducting a flow of molten metal, the path including a completely laterally confined portion; a woven mesh (e.g. glass cloth) filter fixedly positioned in and extending entirely across the laterally confined path portion so that all the metal of the flow passes through the filter; and means for delivering the flow of molten metal to the upstream side of the filter at a head sufficient to effect advance of the molten metal through the filter, and to maintain the flow, downstream of the filter, at a level substantially higher than the uppermost extent of the filter. The invention in one aspect contemplates arranging the laterally confined path portion to conduct the molten metal flow in a vertically upward direction, and positioning the filter so that it extends horizontally entirely across that path portion, i.e. so that the metal of the flow passes through the filter in an upward direcion. In another aspect, the invention contemplates provision of a filter comprising plural layers of glass cloth, and the further provision of a rigid grid for supporting the filter, fixedly positioned in and extending transversely across the laterally confined path portion downstream of and in contiguous relation to the filter.

As embodied in apparatus for continuously casting aluminum, in combination with at least one axially vertical continuous casting mold adapted to receive molten aluminum at its upper end, the invention further comprises means for conducting the flow of molten metal quiescently to the upper end of the mold from a locality in the aforementioned laterally confined path portion downstream of the filter. This conducting means may comprise structure defining a horizontal path for conducting the flow of molten aluminum, at a uniform level higher than the filter and higher than the mold upper end, from the aforementioned locality downstream of the filter in the laterally confined path portion to a second locality from which the molten aluminum descends quiescently into the mold upper end.

In addition, the apparatus may include means disposed in the molten aluminum flow path upstream of the filter for removing entrained gas from the flow of molten aluminum.

The filtering method and apparatus of the invention are useful in a variety of operations involving the handling of molten aluminum or other molten metal, wherein it is desired to free the metal from contaminant particles (i.e. including oxide particles and the various other kinds of particles that may be carried in the metal), and in such operations the invention affords the special advantages discussed above. Illustrative examples of operations in which the present invention may be employed are various types of aluminum casting operations, of which one specific instance is continuous casting of ingots in axially vertical molds. Simply by way of illustration, the detailed description of the invention will be directed to embodiments incorporated in systems and procedures for continuously casting aluminum, it being understood, however, that the invention is as stated applicable in diverse types of casting and other molten metal handling operations.

DETAILED DESCRIPTION

Referring first to FIGS. 1–6, there is shown a system 10 for delivering molten aluminum to a plurality of continuous casting molds 11 from a furnace 12 wherein a body of aluminum is heated and maintained in molten state. The system 10 comprises a siphon 14 for withdrawing molten aluminum from the furnace, means 15 including the vertical outlet leg of the siphon for removing gas from the molten aluminum flowing therethrough, a siphon box 16 defining a laterally confined chamber for receiving the metal from the siphon, a filter 17 through which the metal flows upwardly from the siphon box chamber, a frame 18 for containing the metal above (i.e. downstream of) the filter, and a branched horizontal distributing trough 19 for conducting the metal from the frame to the upper ends of the molds 11. In this system, the siphon 14, box 16, frame 18 and trough 19 together define a continuous molten aluminum flow path, wherein the metal is successively freed of gas and filtered, extending from the furnace to the molds. These structures may be constructed of steel, and at least the siphon box and trough may be internally lined with a suitable heat-insulating refractory material resistant to deterioration by molten aluminum.

The siphon 14 (FIG. 2) has an upwardly slanting inlet leg 20 opening at its lower end into the furnace 12 for withdrawing molten aluminum therefrom, and an axially vertical outlet leg 21 opening downwardly into a receiving chamber 22 defined by the siphon box 16. The upper end of the inlet leg opens into the upper portion of the outlet leg. Both the outlet leg and the upper portion of the inlet leg are surrounded by a heating jacket 23 (FIGS. 2–3) to maintain the aluminum from the furnace in molten state as it traverses the siphon.

Figures 2, 3:
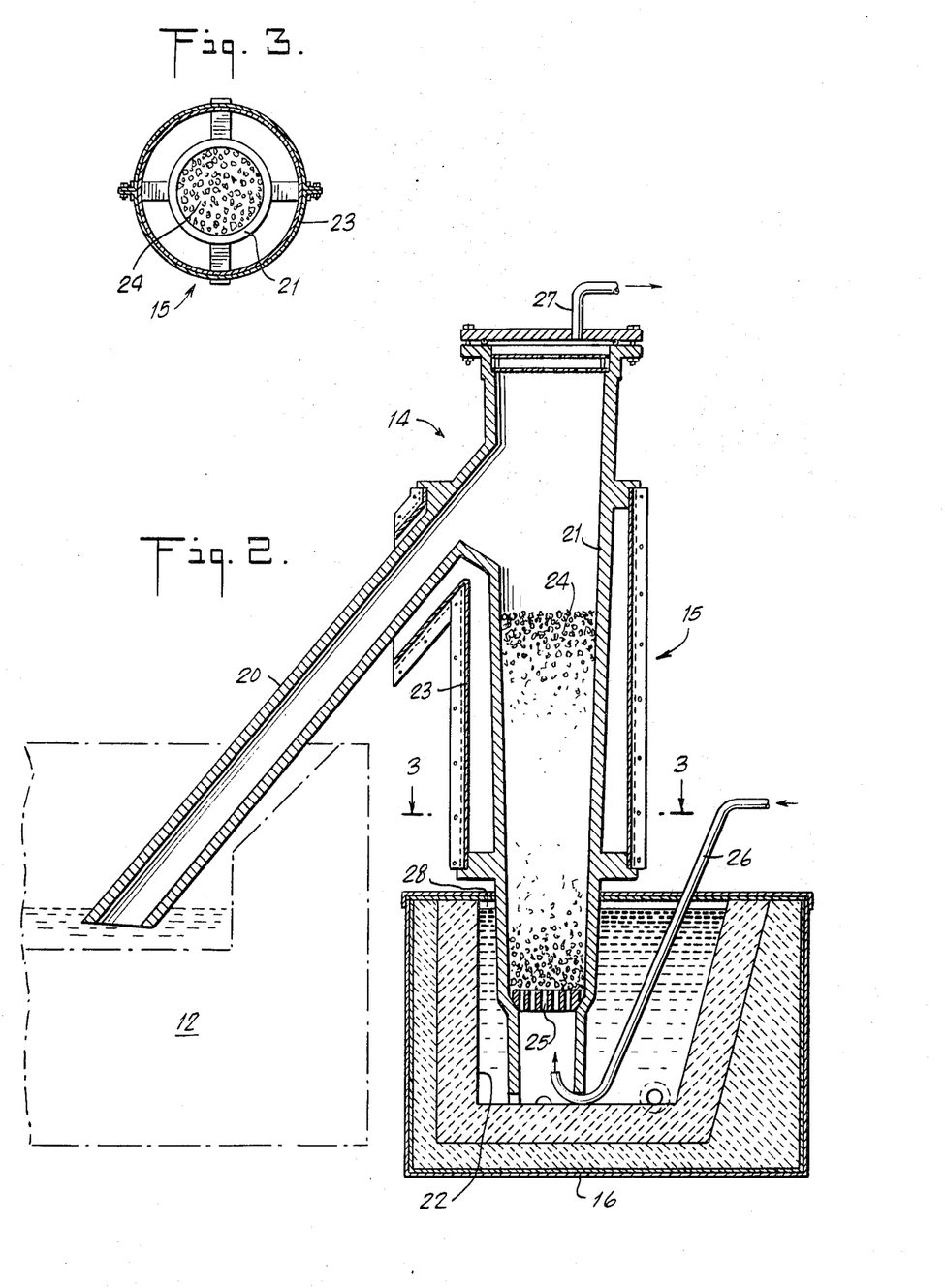
FIG. 2 is an elevational sectional view taken along the line 2—2 of FIG. 1 and showing an illustrative type of structure for removing gas from a flow of molten aluminum before the aluminum is filtered.
FIG. 3 is a cross-sectional view of the gas-removing structure taken along the line 3—3 of FIG. 3.

Throughout much of its length, the siphon outlet leg 21 is filled with a packing 24 of crushed ceramic material supported by a grid 25 which is fixedly mounted in the lower portion of the outlet leg. A flow of a gas (e.g. argon) inert with respect to aluminum is introduced to the lower end of the outlet leg by means illustrated schematically as a tube 26, and rises upwardly therein through and above the packing 25. Gas is withdrawn from the upper end of the siphon, as through a further tube 27, by suitable suction means (not shown) providing within the siphon upper end a vacuum sufficient to afford maintained siphon action effecting withdrawal of molten aluminum from the furnace upwardly through leg 20 and thence downwardly through leg 21. As the aluminum thus traverses the packing 24, the countercurrent flow of argon gas, rising through the leg 21 and brought into intimate extended contact with the aluminum as the molten metal and gas flow over the packing element surfaces, sweeps from the molten aluminum substantially all gas (e.g. hydrogen) that may be carried therein. The removed hydrogen gas rises with the argon to the upper end of the siphon and is withdrawn from the siphon through tube 27. Consequently, the molten aluminum delivered to the receiving chamber 22 at the foot of the siphon outlet leg is essentially free of hydrogen gas.

The receiving chamber is entirely confined by the walls of box 16 and is adapted to contain a body of molten aluminum up to a level 28. Downstream of the receiving chamber, the siphon box also defines a laterally confined and upwardly opening filter chamber 29 (FIG. 4) with a horizontal rectangular upper rim 30 disposed at a level substantially lower than the normal operating level 28 of molten metal in the receiving chamber. In addition, the siphon box defines a laterally confined passage 31 for molten aluminum, extending generally horizontally from the receiving chamber 22 to the filter chamber 29 and so disposed that the uppermost part of passage 31 is substantially lower than the level of the filter chamber rim 30. The floor of chamber 29 slopes downwardly toward passage 31, which has a floor coplanar with the floor of chamber 22; a tap-hole 32, opening through the side wall of siphon box 16 into the lowermost portion of chamber 22 and normally closed by a plug 33, permits the chambers 22 and 29 and the connecting passage 31 to be drained when desired, the downward slope of the floor of chamber 29 facilitating such drainage.

Figures 4, 5:
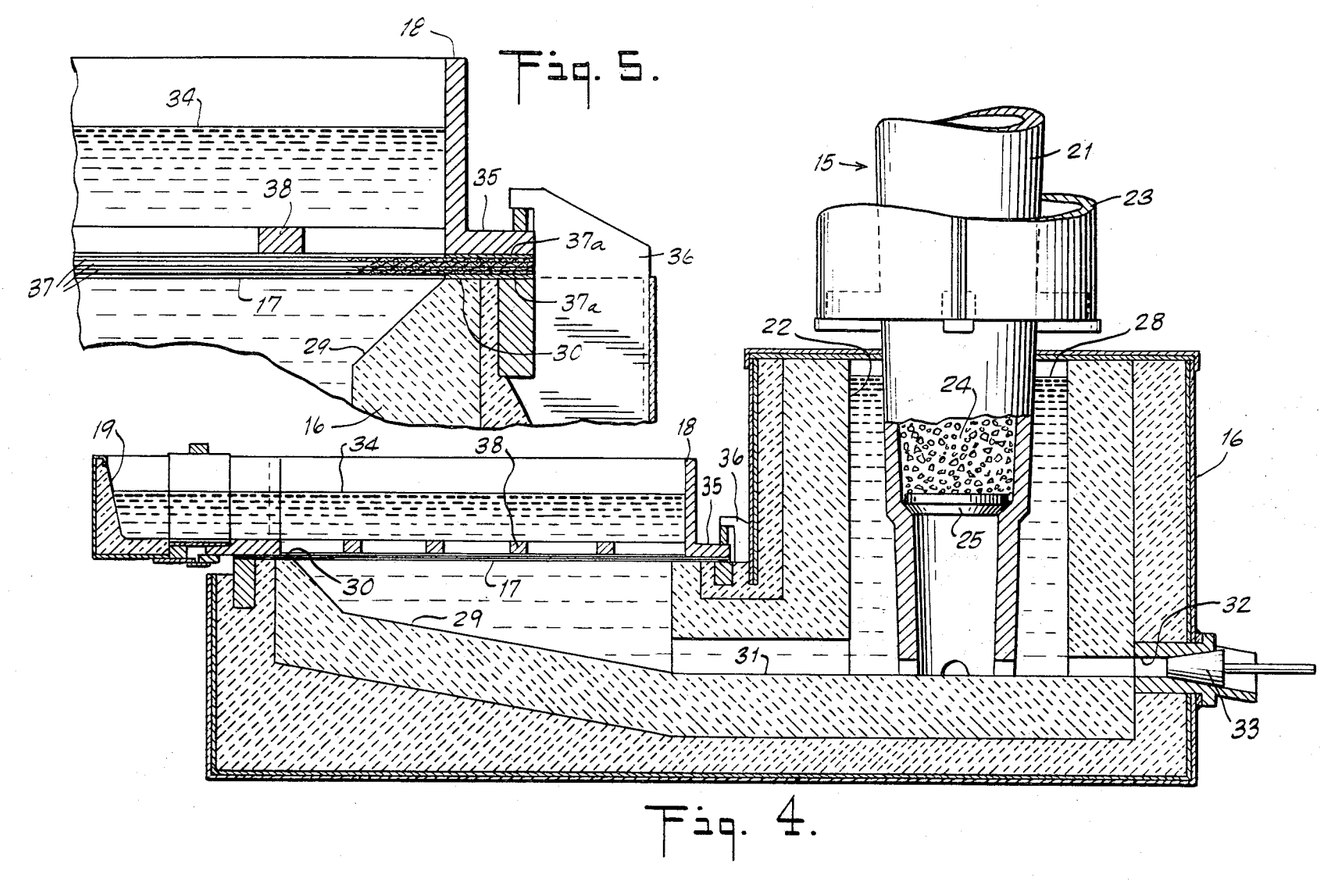
FIG. 4 is an elevational sectional view of the glass cloth filter of the system of FIG. 1, and the associated portions of the molten aluminum flow path, taken along the line 4—4 of FIG. 1.
FIG. 5 is an enlarged detailed sectional view of the filter and associated structure, taken along the line 5—5 of FIG. 1.

The frame 18 is mounted on the filter chamber rim, and comprises a rigid structure having vertical walls which project above the rim to define a laterally confined region, rectangular in horizontal cross section (corresponding in horizontal dimensions to the opening defined by rim 30), for containing molten aluminum at a level 34 which is substantially higher than the rim 30 though lower than the metal level 28 in chamber 22. At its lower end, the frame bears an outwardly projecting horizontal flange 35 which is secured to the siphon box, i.e. so as to hold the frame in place on the rim 30, by means of a plurality of clamps 36 spaced around the periphery of the frame.

The filter 17 is a woven mesh filter fabricated of a material resistant to deterioration under conditions of extended exposure to molten aluminum metal, and preferably comprises plural layers of glass cloth; in the specific example illustrated, it comprises plural contiguous layers 37 of woven glass fiber cloth extending in a horizontal plane entirely across the opening defined by rim 30, and clamped around its entire periphery between the rim 30 and the flange 35 as shown in FIG. 5, the junction between the rim, filter and flange being liquid-tight. A pair of rectangular gaskets 37a fabricated of a sheet heat-insulating material such as that commercially available under the trade name "Fibrefrax" may be respectively interposed between the filter periphery and flange 35, and between the filter periphery and rim 30. A relatively heavy rigid grid 38 shown as defining plural rows of large hexagonal openings is fixedly mounted in (e.g. formed integrally with) the frame 18, extending horizontally across the interior of the frame above and in contiguous relation to the upper (i.e. downstream) surface of the filter 17.

From the foregoing description it will be understood that the siphon box 16 and frame 18 together constitute wall structure defining a completely laterally confined portion of a path for flow of molten aluminum, and extending to a level substantially above the entirety of filter 17 both upstream and downstream of the filter so as to confine the molten metal flow, downstream as well as upstream of the filter, at levels substantially higher than the filter. The path portion thus defined is arranged to conduct the molten metal vertically upward through the filter, which is so arranged (i.e. being peripherally secured to the aforementioned wall structure) that the entire flow of molten metal advancing along the path must pass through the filter.

Figure 1:
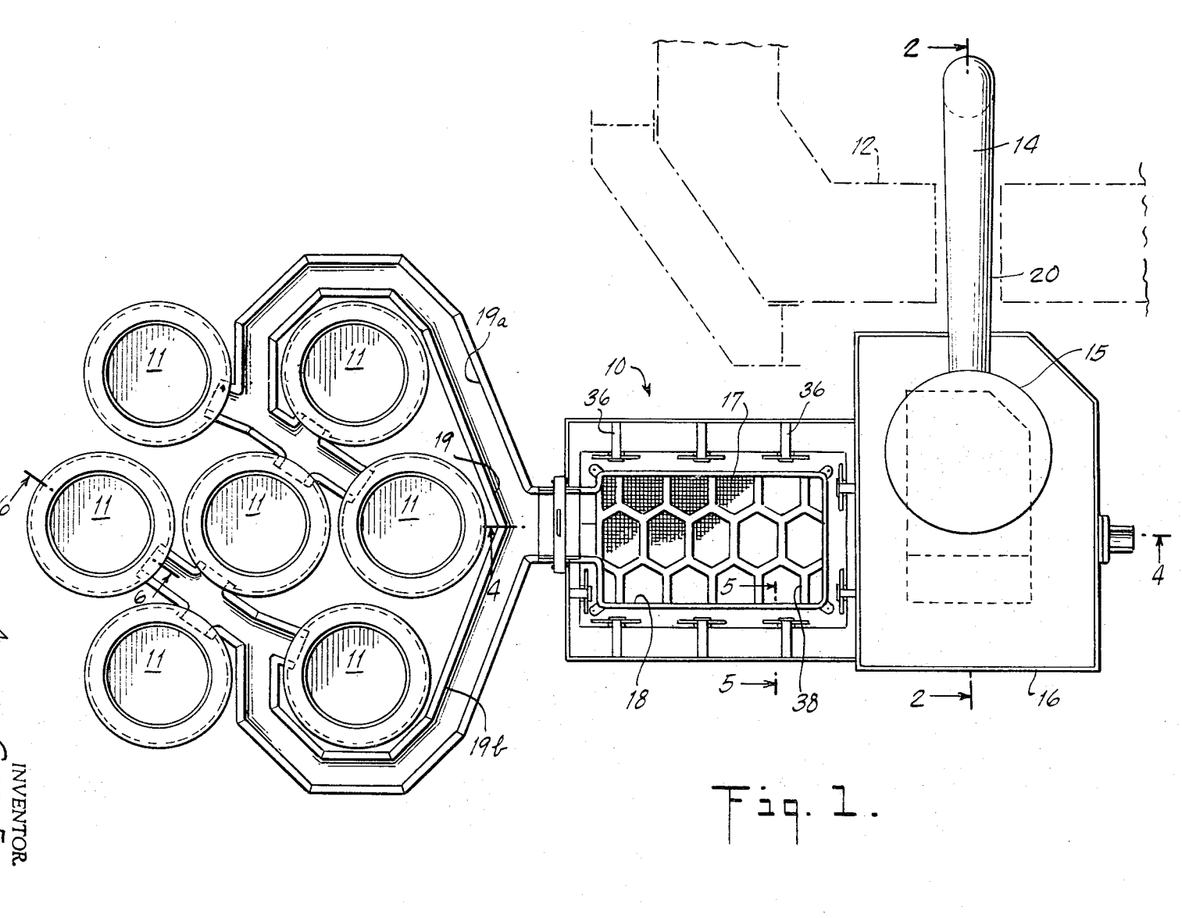
FIG. 1 is a plan view of a system for treating molten aluminum in accordance with the invention and delivering the treated metal to plural ingot molds arranged for continuous casting operation.

The distributing trough 19 opens through one side wall of the frame 18 to receive molten aluminum contained within the frame, and extends horizontally therefrom through horizontal branches 19a and 19b to deliver portions of the molten metal to the upper ends of each of the seven molds 11 connected to the system 10 of FIG. 1. These troughs are supported by suitable structure (not shown) at such elevation as to contain molten aluminum throughout their lengths at a uniform level which is the same level as that of the molten aluminum in frame 18, i.e. level 34.

Figure 6:
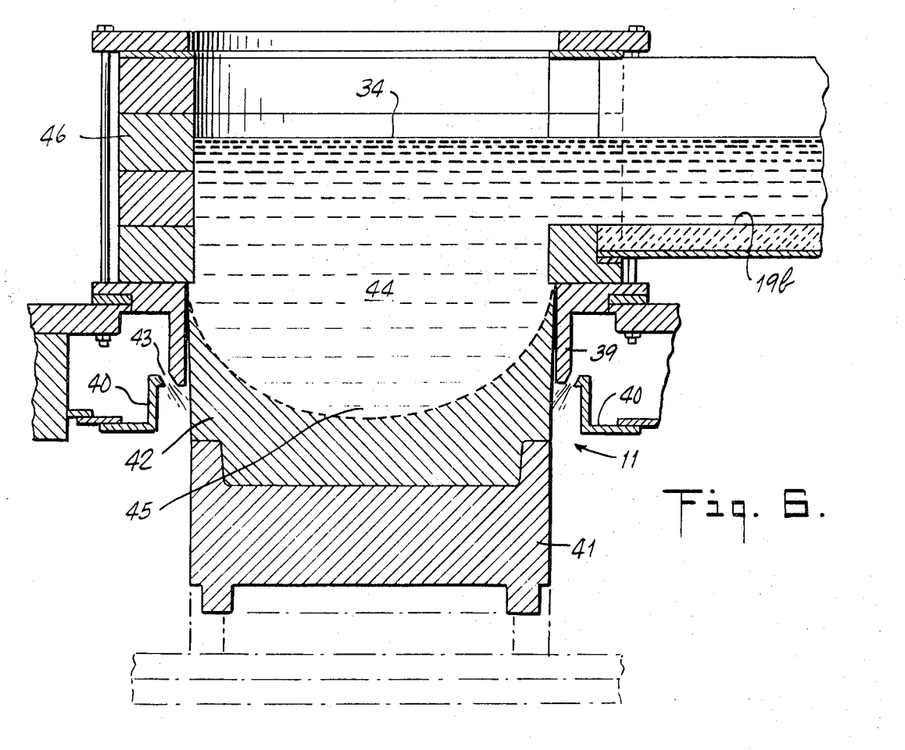
FIG. 6 is an elevational sectional view of one of the continuous casting molds of the system of FIG. 1, taken along the line 6—6 of FIG. 1.

The seven molds 11 are identical to each other in structure and are each adapted to cast an elongated cylindrical ingot of aluminum, one of these molds being shown in detail in FIG. 6. As there illustrated, the mold includes a shallow, axially vertical annular mold wall 39 open at both its upper and its lower end, surrounded by a cooling jacket 40 through which a coolant liquid such as water may be passed to chill the mold wall externally. The mold structure further includes a platform 41, positioned and dimensioned to initially close the lower end of the mold, and arranged to be moved vertically downward away from the mold by suitable means (not shown).

In use of the mold to cast an ingot 42, after initial introduction of molten aluminum to the mold and solidification of the peripheral portion of the metal within the mold (owing to the described chilling of the mold wall), the platform 41 is moved progressively downward, supporting the solidifying ingot 42 and thereby effecting progressive withdrawal of the ingot from the mold lower end, while fresh molten aluminum is progressively supplied to the upper end of the mold. Coolant liquid from jacket 40 is directed as a spray against the emerging solid ingot surface below the mold through an annular slit 43 defined between the jacket and the mold lower end, to promote internal solidification of the ingot. Within the mold, during the casting operation, there is maintained a pool or body 44 of molten aluminum that extends downwardly as a sump 45 into the interior of the solidifying ingot. This casting operation, and the mold and associated structures with which it is performed, are well known in the art and accordingly need not be described in further detail.

In the system 10, each of the molds 11 bears an axially vertical annular reservoir structure 46 mounted on and projecting coaxially upwardly from the upper rim of the mold wall 39. This structure, fabricated of and/or lined internally with a suitable heat-insulating material and sometimes termed a "hot top," defines an upward extension of the mold interior and is adapted to contain a portion of the molten aluminum pool 44 extending upwardly for some distance above the upper end of the mold; the heat-insulating material serves to retain heat in this upper portion of the aluminum pool and hence to prevent premature solidification thereof.

A branch of the trough 19 opens into each of the reservoirs 46 through the side wall of the reservoir at a level below the level 34 of molten aluminum in the trough, for delivery of molten aluminum to the interior of the reservoir. The metal pool in each reservoir extends upwardly to the same level 34. Thus the molten aluminum flows from the troughs into the reservoirs 46 at a maintained uniform level, and then descends quiescently, in the pools 44, into the interiors of the molds.

The practice of the present method in the described system may now be readily understood. Molten aluminum from the furnace 12 is delivered by the siphon 14 to the receiving chamber 22 in such manner as to maintain the body of metal in the receiving chamber at a level 28 substantially higher than the level of the filter 17, while hydrogen gas is removed from the metal descending in the vertical leg of the siphon by the flow of argon gas ascending therethrough. From the receiving chamber, the molten aluminum flows through passage 31 to the filter chamber 29 and thence upwardly through the filter to the region defined by frame 18; the filter removes oxide and other particles from the aluminum flow. Downstream of the filter, the flow advances from frame 18 along the branched distributing trough 19 into the reservoirs 46 of the molds 11, for continuous casting of aluminum ingots.

The flow of aluminum metal from chamber 22 through the filter and along the horizontal trough 19 to the molds is effected (as the metal descends into the molds from the down-stream end of the troughs) by the maintained head of metal in chamber 22, this head being represented by level 28. There is a pressure drop across the filter, owing to the resistance of the filter to passage of molten metal, and hence the metal level 34 downstream of the filter is somewhat lower than the upstream level 28; however, the head of metal upstream of the filter is maintained (by continuing supply of molten aluminum through the siphon as aluminum is drawn down into the molds) sufficiently high to maintain the downstream level 34 substantially above the level of the filter 17. The filter is thus maintained entirely submerged in molten aluminum throughout the casting operation, regardless of variations in upstream and downstream metal levels, i.e. since these levels are sufficiently far above the filter to accommodate the range of variations in level normally encountered in operation, without exposing any part of the filter. Accordingly, all of the metal passes quiescently through the filter wall beneath the molten metal surface, there being no exposed portion of the filter through which metal could leak above the surface.

In the described procedure, the filtered metal flows quiescently along a horizontal path at a uniform level over the entire extent of its advance from the filter into the mold reservoirs 46. In this way, even though oxide may form on the surface of the metal downstream of the filter, the metal is delivered from the filter to the molds without any point encountering any surface disturbance or turbulence such as might tend to recontaminate the filtered metal by introducing thereto particles of oxide from the surface.

A further advantage of the described filtering arrangement is that a filter relatively highly resistive to metal flow—providing superior filtering action, but also creating a relatively large pressure drop—may be employed, owing to the total submergence of the filter, without increasing at all the possibility of recontamination of the filtered metal, as would be the case if the filter were only partially submerged. In particular, the filter preferably comprises at least two layers of glass cloth, or indeed three, four, five, six or even more layers, it having been found that for glass cloth of any given opening size, increase in number of layers enhances the efficacy of the filter in preventing passage of particles through and beyond the filter. For example, in one test it was found that in a product of continuously cast aluminum, the number of microshrinkage pores per square centimeter (a measure of the occurrence of inclusions in the cast ingot) decreased with increase in the number of layers of glass cloth through which the metal was filtered before casting, as follows:

| Number of glass cloth layers: | Microshrinkage pores per cm.$^2$ |
| --- | --- |
| 1 | 130 |
| 2 | 40 |
| 3 | 25 |
| 5 | 15 |
| 7 | 10 |

The glass cloth used in this test was a cloth commercially available under the designation "Bay Mills 625" glass cloth.

Stated in other words, the described filter arrangement permits maintained total submergence of the filter and consequent avoidance of recontamination of the filtered metal, regardless of upstream pressure head or difference between upstream and downstream molten metal levels; hence the upstream pressure head may have the requisite magnitude for use with a filter comprising three or more layers of glass cloth. The individual glass cloth layers may be spaced apart (with or without plural supporting grids), but in the example of arrangement shown they are contiguous and hence are all supported on the downstream side by the grid 38. The grid contributes to the attainment of assured effective filtering with a multilayer glass cloth filter, in that the grid supports the filter on the downstream side against rupture or other damage from the force of the substantial upstream pressure head required with such filter. Furthermore, because the grid holds the filter flat in a plane extending transversely of the molten aluminum flow path, the metal flow and pressure head are desirably uniform over the full area of the filter.

The individual layers of glass cloth used in the present filter may comprise cloth of a type heretofore used for filtration of molten aluminum. Such cloth may, for example, have openings in a size range between about 0.01 and about 0.03 inch square. It will be understood that reference herein to plural layers of glass cloth embraces not only plural discrete layers but also multiple ply cloth which in effect comprises plural layers woven together. Also, when plural layers are used, the different layers may have mesh openings of respectively different sizes.

Figure 7:
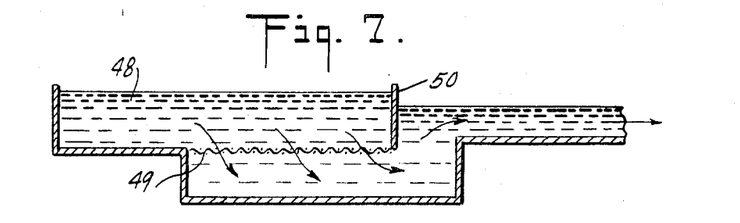
FIG. 7 is a simplified schematic view in elevational section of an alternative filter arrangement with which the method of the present invention may be practiced.
Figure 8:
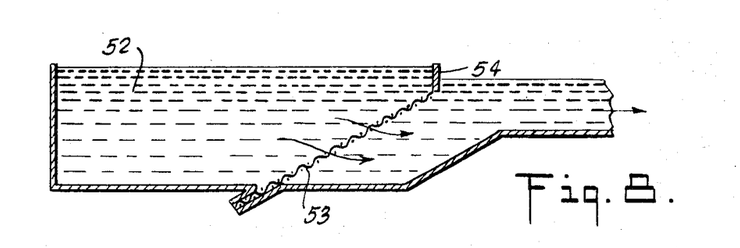
FIG. 8 is a view similar to FIG. 7 of still another filtering arrangement suitable for the practice of the present method.

Passage of molten aluminum upwardly through a horizontal filter, as in the arrangement described above, affords the additional advantage that the force of gravity acting on particles carried by the molten metal tends to draw the particles downwardly away from the upstream side of the filter and therefore cooperates with the filter in opposing the force of the upstream pressure head to prevent passage of the particles through and beyond the filter. However, the advantages of filtration of molten metal through a totally submerged glass cloth filter may be achieved in substantial measure with other flow and filter orientations. For example, as shown in FIG. 7, a flow of molten metal 48 may be advanced downwardly through a glass cloth filter 49 extending horizontally entirely across a laterally confined molten metal flow path defined by wall structure 50 extending substantially above the level of the filter both upstream and downstream of the filter. Again, as shown in FIG. 8, a molten metal flow 52 may be directed generally horizontally through a glass cloth filter 53 extending, in a plane oriented at a substantial angle to the horizontal, entirely across a laterally confined flow path which, as before, is defined by wall structure 54 that extends substantially above the uppermost point of the filter both upstream and downstream thereof.

In each case, with the flow maintained at a level above the uppermost point or level of the filter on both the downstream and the upstream side of the filter (i.e. by maintenance of a sufficient upstream pressure head), the filter is kept totally submerged and the advantages of such total submergence, with respect to avoidance of the recontamination of filtered metal such as is encountered in use of a partially submerged filter, are thereby achieved. Further in accordance with the invention, the filters of FIGS. 7 and 8 may comprise three or more layers of glass cloth, and may be supported on their downstream sides by rigid flat grids (not shown) similar to the grid 38 of the system of FIGS. 1–6, to achieve the above-described additional advantages afforded by these features. Also, downstream of the filters in the FIGS. 7 and 8 arrangements, the filtered metal may be conducted quiescently along a horizontal path at a uniform level to casting molds or other utilization locality, in the same manner as in the system of FIGS. 1–6, to avoid turbulence or disturbance of the metal surface downstream of the filter, such as might lead to recontamination of the filtered metal.

While the provision of a single filter (which may comprise plural layers of glass cloth) in a molten metal flow path has been described above, a plurality of such filters e.g. arranged in series—spaced along a metal flow path so as to be successively traversed by the flow—may be provided, or such a filter may be employed in series with another type of filter, such as a confined bed of refractory particles positioned in the flow path. Whether one or plural glass cloth filters are used, either alone or in combination with other types of filters, in accordance with the invention the glass cloth filter or filters are maintained continuously entirely submerged in the molten metal throughout the filtering operation, as it is found that exposure of even a very minor portion of a glass cloth filter above the surface of molten aluminum being filtered may lead to recontamination of the filtered metal with oxide on the downstream side of the filter, indeed to such an extent as may largely vitiate the effectiveness of the filtering action.

Referring now to FIGS. 9–13, there is shown an alternative system 60 for filtering molten aluminum and delivering the filtered metal to plural continuous casting molds, in accordance with the invention. The system 60 resembles that of FIGS. 1–6 in utilizing a horizontal filter through which the molten metal passes upwardly, but this system does not include means for removing gas from the metal, since in many instances the filtering action itself provides adequate freedom of the cast ingots from voids and inclusions, without such gas removal. Also, the system 60 delivers the filtered metal downwardly into tubes that open into the interiors of the molds, rather than laterally into reservoirs of molten metal maintained at the tops of the molds as in the system of FIGS. 1–6.

Figure 9:
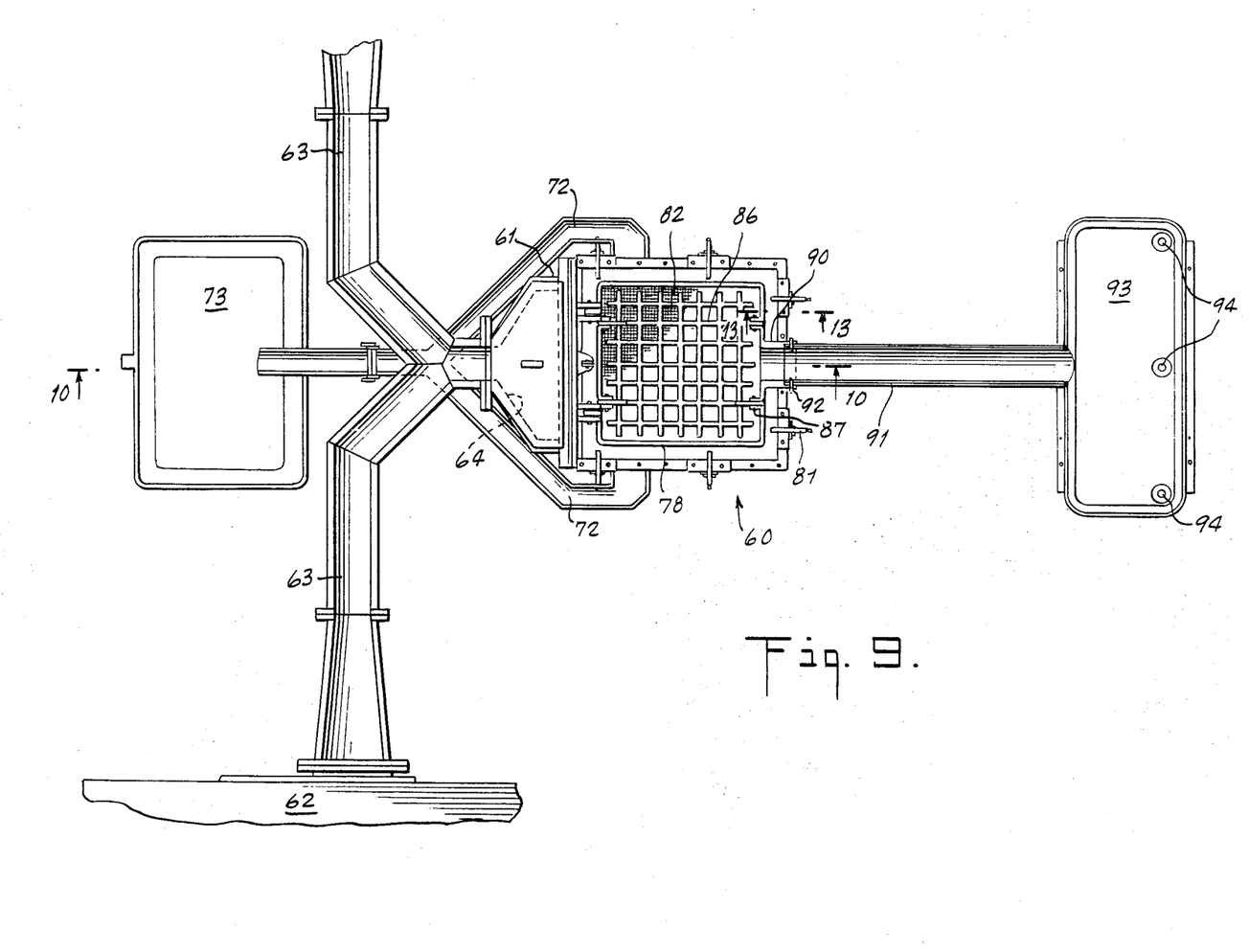
FIG. 9 is a plan view of a modified system for filtering molten aluminum in accordance with the invention and delivering the filtered metal to plural continuous casting molds.
Figure 10:
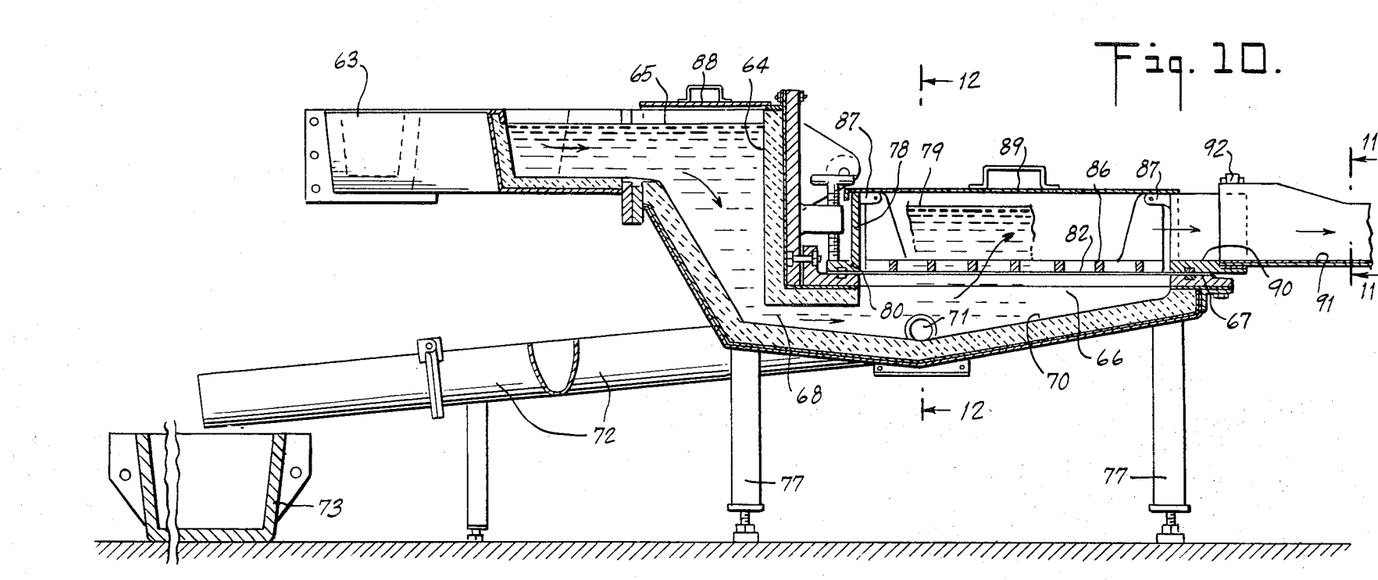
FIG. 10 is an elevational sectional view of the filter and associated metal flow path portions of the system of FIG. 9, taken along the line 10—10 of FIG. 9.
Figure 11:
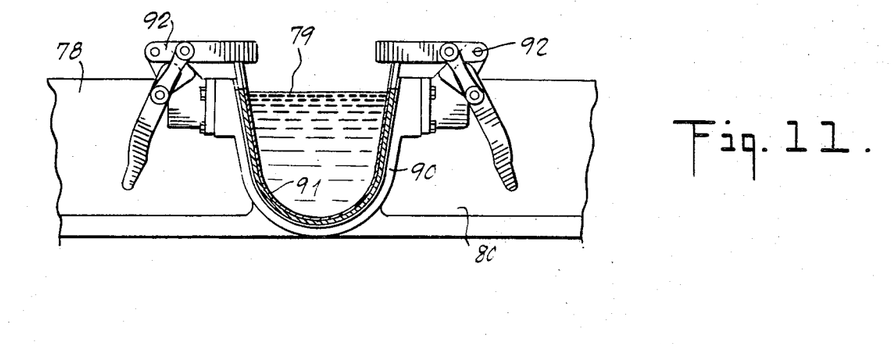
FIG. 11 is a cross-sectional view of a portion of the metal flow path downstream of the filter in the system of FIG. 9, taken along the line 11—11 of FIG. 10.

The structure of the system 60 includes a steel-walled and refractory-lined filter box 61 to which molten metal is supplied from either of two furnaces (one being shown at 62) through a pair of converging troughs 63 that open into a common receiving basin 64, defined by box 61 and adapted to contain a body of molten aluminum extending e.g. up to a level 65. Downstream of basin 64, the box 61 defines a filter chamber 66 which opens upwardly and has a rectangular upper rim 67 lying in a horizontal plane substantially lower than the upstream metal level 65. The filter box further defines a completely laterally confined passage 68 for conducting molten aluminum downwardly and then generally horizontally from the basin 64 into the chamber 66 at a level below the rim 67.

The floor 70 of the filter chamber slopes downwardly (FIG. 10), and at its lowest point are positioned two tapholes 71, respectively disposed on opposite sides of the filter box, through which molten metal may be drained from the filter box, e.g. upon shutdown of operation. A pair of drain troughs 72 are respectively positioned on opposite sides of the filter box to receive molten metal from the tap holes, and slope downwardly therefrom in converging relation to deliver the drained metal to a basin 73. The tap holes are normally closed by plugs 74 (FIG. 12), which are carried by arms 75 having handles 76 and pivotally connected to the sides of the filter box to facilitate movement of the plugs between closed and open position. The filter box and associated troughs are mounted on suitable support structure including legs 77.

Mounted on and projecting upwardly from the filter chamber rim 67 is a rectangular frame 78 having vertical walls for containing a body of molten aluminum extending e.g. up to a level 79 which is higher than rim 67 but lower than level 65. A horizontal flange 80 projects outwardly from the lower end of the frame and is secured to the filter box by a plurality of toggle clamps 81 (FIG. 13) spaced around the periphery of the frame, to hold the frame in place.

Figures 12, 13:
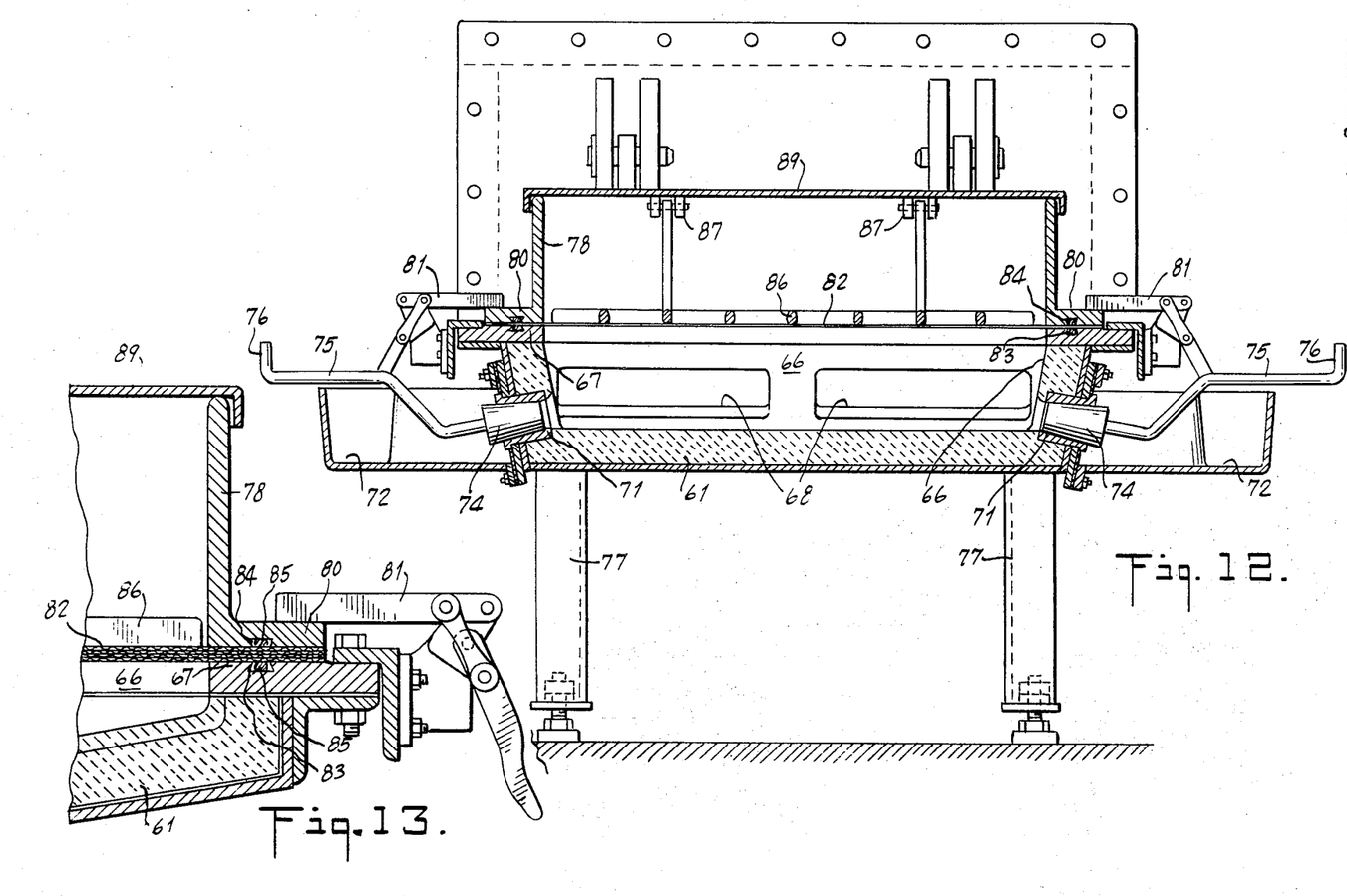
FIG. 12 is a further sectional view of the filter and associated structure of the system of FIG. 9, taken along the line 12—12 of FIG. 10.
FIG. 13 is an enlarged detail sectional view of the filter of the system of FIG. 9, taken along the line 13—13 of FIG. 9.

A glass cloth filter 82, preferably comprising three or more contiguous layers of glass cloth, extends in a horizontal plane entirely across the opening defined by rim 67, and is clamped around its entire periphery between the rim 67 and the frame flange 80. Grooves 83, 84 may be formed in the facing surfaces of the rim and flange to receive gaskets 85 which provide a fluid-tight seal between the filter edges and the rim and flange.

A relatively heavy rigid grid 86 extends horizontally across the region defined by frame 78, above the upper (i.e. downstream) surface of the filter 82 in contiguous relation thereto, being fixedly mounted in such position by brackets 87 that project inwardly from the side walls of the frame 78. This grid defines a regular array of relatively large square openings, and serves to support the filter on its downstream side in flat horizontal position against the force of the upstream pressure head of metal.

Covers 88 and 89 may be provided for the receiving basin 64 and the frame 78, respectively.

On one side, the frame 78 has an axially horizontal U-shaped flange 90 projecting outwardly from a vertical side wall of the frame and defining an opening through that frame side wall that extends substantially beneath the level of molten metal contained within the frame but is nevertheless above the level of the filter 82. The inlet end of an upwardly opening horizontal trough 91 of U-shaped cross section is supported within flange 90 and secured thereto by means of a pair of toggle clamps 92. This trough extends horizontally from the flange 90 to a distributing basin 93 which is positioned vertically above the tops of the continuous casting molds (not shown) to which molten aluminum is to be delivered. The distributing basin has vertical walls arranged to contain a body of molten aluminum that extends upwardly to the same level 79 as in the frame 78.

The system 60 of FIGS. 9–13 is arranged to supply molten aluminum to three continuous casting molds, each of which may be similar to the molds 11 of FIGS. 1–6, but which lack the reservoirs or "hot tops" 46. Three dip tubes 94 extend vertically downward from the distributing basin 93 into the respective molds, opening upwardly into the basin through the floor thereof, and opening downwardly into the molds below the level at which the molten metal pools are normally maintained within the molds.

In the practice of the present method with the system of FIGS. 9–13, during continuous casting operation, molten metal is supplied e.g. from furnace 62 to the receiving basin 64 so as to maintain a body of molten aluminum in the receiving basin at a level 65 which may vary, but is at all times substantially above the level of the filter 82. From the receiving basin, the metal flows through passage 68 into the filter chamber 66 and thence upwardly through the filter 82 into the frame 78. The metal advances from frame 78 along a horizontal path through the trough 91 to the distributing basin 93, and then downwardly through the dip tubes 94 into the molds, for continuous casting of ingots. The head of metal upstream of the filter, represented by level 65 in the receiving basin, is sufficient to maintain the metal downstream of the filter at a level 79 higher than the filter in the frame 78, trough 91 and distributing basin 93. Thus, downstream of the filter, the metal flows quiescently at a uniform level into the distributing basin, from which it descends quiescently into the molds through the dip tubes 94. Particles contained in the metal are removed by the filter 82, and the maintained complete submersion of the filter below level 79, together with the quiescent flow of metal downstream of the filter, prevents recontamination of the the filtered metal.

By way of further illustration of the advantages of the invention, reference may be had to the following specific example:

A plurality of aluminum ingots were continuously cast and rolled into sheet. Samples of the sheet were buffed remove defects created mechanically incident to rolling and handling. The buffed samples were chemically brightened and anodized, and then examined for so-called "razor streak" defects, which are caused by inclusions of foreign matter such as oxide particles in the cast ingots. The incidence of razor streak defects per square foot was determined for each area examined in each of the samples. This "razor streak" examination of sheet aluminum is a test commonly employed in the art and provides a measure of the cleanliness (freedom from inclusions) of the ingot from which the examined sheet was rolled.

All of the ingots tested were cast from the same alloy, under essentially similar casting conditions, in molds of the general type described above. Rolling and subsequent treatment of the samples was also the same in all cases. Some of the ingots were cast from metal filtered only through a double layer of glass cloth positioned within the mold and arranged in conventional manner as a filter bag or basket (hereinbelow termed "Filter A"). The other ingots were cast from metal filtered through not only the aforementioned double layer in the mold (Filter A) but also through a four-layer completely submerged glass cloth filter (hereinbelow termed "Filter B") arranged as in the system of FIGS. 9–13 described above, with upward flow of the metal through the filter.

Each sample sheet was inspected at three locations, and the incidence of razor streaks (¼ inch or more long) per square foot at each of the three inspected locations was averaged for each sheet. Results were as follows:

| Filter | Average razor streaks/ft.² |
|---|---|
| Sheet: | |
| 1 -------- A | 17 |
| 2 -------- A | 45 |
| 3 -------- A | 5 |
| 4 -------- A | 43 |
| 5 -------- A | 35 |
| 6 -------- A | 41 |
| 7 -------- A+B | 1 |
| 8 -------- A+B | 0 |
| 9 -------- A+B | 0 |

These results demonstrate the very marked increase in filtering efficacy, and concomitant decrease in inclusions in cast ingot, achieved with filtration in accordance with the present invention.

A further series of ingots was cast, and samples of sheet rolled therefrom were tested in the manner described above. In each of these casting operations, the molten metal was subjected to an extended settling time. Some of the ingots were cast using filter A alone; in the casting of others, both filters A and B were used, or a filter similar to filter B but having five rather than four glass cloth layers (hereinbelow termed "Filter C"). One ingot was cast with filter B alone. Another was cast using only a filter similar to filter A but having a single layer of glass cloth (hereinbelow termed "Filter D"). Results were as follows:

| Filter | Setting time (minutes) | Average razor streaks/ft.² |
|---|---|---|
| Sheet: | | |
| 10 -------- A+B | 35 | 0 |
| 11 -------- A+C | 140 | 0 |
| 12 -------- B | 30 | 1.3 |
| 13 -------- B | 35 | 0 |
| 14 -------- A+B | 140 | 2.7 |
| 15 -------- A+B | 360 | 0 |
| 16 -------- A | 25 | 0.7 |
| 17 -------- A | 25 | 4 |
| 18 -------- A | 35 | 4 |
| 19 -------- A | 105 | 5.3 |
| 20 -------- A | 135 | 0.7 |
| 21 -------- D | 75 | 4 |

In this series of tests, the level of inclusions was in general substantially lower than in the case of the casts made using filter A alone in the first series of tests. Nevertheless, the casts employing filtration in accordance with the present invention (sheets 10–15) again demonstrated in general a significantly lower level of inclusions than those employing filter A or D alone.

I claim:
1. A method of filtering molten aluminum, comprising
(a) advancing a flow of molten aluminum along a defined path and through a glass cloth filter extending entirely across a completely laterally confined portion of said path, said filter extending substantially horizontally entirely across said laterally confined path portion and being supported by a rigid grid fixedly positioned in and extending substantially horizontally across said laterally confined path portion above and in contiguous relation to the upper surface of said filter, said filter comprising at least two contiguous layers of glass cloth, said flow being advanced vertically upwardly through said filter, and
(b) conducting said flow from the downstream side of said filter quiescently along a horizontal portion of said path at a liquid level which is constant over the full extent of said horizontal path portion while
(c) supplying said flow of molten aluminum to the upstream side of said filter at a head continuously maintained sufficiently high so that the liquid level in said horizontal path portion is continuously substantially above the uppermost extent of said filter.

2. A method of filtering molten metal, comprising
(a) advancing a flow thereof along a defined path and vertically upwardly through a woven mesh filter extending substantially horizontally entirely across a completely laterally confined portion of said path and being supported by a rigid grid fixedly positioned in and extending substantially horizontally across said laterally confined path portion above and in contiguous relation to the upper surface of said filter, and
(b) conducting said flow from the downstream side of said filter quiescently along a horizontal portion of said path at a liquid level which is constant over the full extent of said horizontal path portion, while
(c) supplying said flow of molten metal to the upstream side of said filter at a head continuously maintained sufficiently high so that the liquid level in said horizontal path portion is continuously substantially above the uppermost extent of said filter.

References Cited

UNITED STATES PATENTS

| 704,244 | 7/1902 | Davis ------------ 210—311 X |
| 2,391,704 | 12/1945 | Hughes ---------- 210—499 X |
| 2,467,021 | 4/1949 | Fischer ---------- 210—311 X |
| 3,006,473 | 10/1961 | Gamber ------------ 210—69 |
| 3,281,238 | 10/1966 | Bachowski et al. ---- 210—69 X |
| 2,757,425 | 8/1956 | Ducan et al. -------- 164—134 |

FOREIGN PATENTS

| 91,941 | 6/1958 | Norway ------------ 210—69 |

JAMES L. DE CESARE, Primary Examiner

U.S. Cl. X.R.

164—134; 210—311, 499